United States Patent Office 3,247,296
Patented Apr. 19, 1966

3,247,296
CONTINUOUS PROCESS FOR PRODUCING COLORED REGENERATED CELLULOSE FILM
Daniel Wearring, Chicago, and Joseph C. Lescher, Oak Lawn, Ill., assignors to Union Carbide Corporation, a corporation of New York
No Drawing. Filed June 25, 1962, Ser. No. 205,084
15 Claims. (Cl. 264—78)

This invention relates to the production of dyed cellulosic products and more particularly, to a method of producing transparency, bright and speck-free colored cellulosic films formed from viscose.

It is known to dye cellulosic products and especially cellulosic fibers with organic coloring agents known as vat dyes. Vat dyes are those coloring agents which can easily be reduced to a soluble leuco form in which they can readily impregnate the cellulosic material. Subsequent oxidation of the reduced dye produces the insoluble colored dye in a form that is remarkably fast to washing, light and chemicals. The reducing agents are usually aqueous alkaline solutions such as an aqueous alkaline sodium hydrosulfite solution. Oxidation to the insoluble state can be effected by air, perborates such as sodium perborate, dichromates such as sodium dichromate or similar materials.

However, when employing these organic coloring agents known as vat dyes for coloring preformed cellulosic films, there are problems of preferential absorption of the dye due to different rates of diffusion which necessitates rigid control of the dyebath concentrations when a combination of vat dyes are used. Variation in composition of the cellulose solution and coagulation and regeneration conditions also affect the rate of diffusion of the dye into the film. These adverse effects cause nonuniform coloring of the cellulosic films which detracts from the appearance of the products encased within said films.

Adding a vat dye in the form of a leuco solution, i.e. reduced and solubilized, to viscose prior to extrusion also has not produced wholly satisfactory colored cellulosic films. The leuco solution is unstable, necessitating special handling. Moreover, the leuco solution must be held at elevated temperatures to avoid precipitation of the dye in the solution, and air must be excluded from the leuco solution to avoid formation of the insoluble oxidized form of the dye prior to extrusion of the viscose. Another serious drawback to this technique is that to produce dark shades, it is necessary to use a relatively concentrated leuco solution which can cause gelation of the viscose, or it is necessary to add large volumes of less concentrated leuco solution to the viscose with resulting dilution of the viscose whereby the properties of the viscose or the resultant regenerated cellulosic film are adversely affected.

Another method that has been proposed to produce colored cellulosic film, is to batchwise mix the vat dye in a water slurry form with viscose for a period of about two hours. After the vat dye pigment is homogeneously dispersed, a reducing solution of alkaline sodium hydrosulfite is slowly added and the mixing continued and the entire batch deaerated for an additional eight hours or longer. The viscose is then regenerated in the usual manner. This technique of prolonged mixing, reaction, and deaeration times requires large storage tanks and is not readily adaptable for a continuous process. Further, the viscose is somewhat sensitive to the concentration of the reducing agent and this together with the long reaction time requires that additional controls be employed to insure that the viscose composition has the proper degree of ripeness for regeneration.

Accordingly, it is an object of this invention to provide a new and improved method of forming vat dyed colored cellulosic products.

Another object of this invention is to provide a method of forming uniformly colored vat-dyed cellulosic film of improved transparency and brightness.

Other and additional objects will become apparent hereafter.

Accordingly, the objects of the invention are accomplished by metering into a continuously moving viscose mass, a vat dye, in predetermined proportions depending upon the depth of color desired in the regenerated cellulose films, and a reducing agent, comprising an aqueous alkaline solution of sodium hydrosulfite in an amount sufficient to reduce the vat dye to its soluble leuco form, but insufficient to cause gelation of the viscose, turbulently mixing the viscose, vat dye and reducing agent, in the absence of air, to form a homogeneous mixture, passing the homogeneous mixture to an extrusion nozzle, the elapsed time from the onset of the mixing of the vat dye, reducing agent and viscose to the time of extrusion being sufficient to completely reduce the vat dye to its soluble leuco state, and thereafter extruding the mixture of viscose and reduced vat dye and regenerating said viscose and oxidizing said vat dye to produce a colored regenerated cellulose film.

Any of the large class of organic dyes commonly known as vat dyes, which can be readily reduced in viscose to a soluble form and in turn oxidized to an insoluble form can be used in the present invention for coloring cellulosic materials. Typical illustrations of the class of vat dyes useful for the present invention are found in The Chemistry of Synthetic Dyes by K. Venkataraman, Academic Press Inc. New York (1952), and particularly in chapter 1 of volume 1, and chapters 30, 31 and 32 of volume 2.

Generally, the vat dyes are sold under trademarks followed by the name of the color and letters which show the shade of the color. A Color Index number is also generally given. Such number is assigned by the Society of Dyers and Colourists. By referring to the Color Index in the appropriate volume published by this Society, further details of the particular vat dyes can be obtained. An example is Ponsol Golden Orange G, Color Index Vat Orange 9; Ponsol is a trademark for vat dyes of the anthraquinone type; Orange is the color; G stands for the particular tone of the orange; and Color Index Vat Orange 9 can be found in Color Index Second Edition, volume 4 (1956) published by the Society of Dyers and Colourists (Dean House, Piccadilly, Bradford, Yorkshire, City and Province, England).

Illustrative of vat dyes which can be used in the process of the present invention include Vat Yellow 1 sold under the trademark Cromophtal Yellow ATR; Vat Orange 2 sold under any of the trademarks Ponsol Golden Orange RRT, Cibanone Golden Orange 2R or Ahcovat Orange RRT; Vat Orange 3 sold under the trademark Ponsol Brilliant Orange RK; Vat Orange 7 sold under the trademark Cromophtal Orange AGR; Vat Orange 9 sold under any of the trademarks Ponsol Golden Orange G or Cibanone Golden Orange G; Vat Orange 15 sold under any of the trademarks Amanthrene Orange R, Ponsol Golden Orange 3G, Ahcovat Golden Orange 3G or Cibanone Golden Orange 3G; Vat Red 29 sold under the trademark Carbanthrene Scarlet R. Other vat dyes which can also be used in the process of this invention include those dyes sold under the trademark Ponsol Scarlet RX, a vat dye of the anthraquinone type.

The color index of the pigments recited herein are set forth in Color Index, Second edition, volume 4 (1956), The Society of Dyers and Colourists.

While it is preferred to employ the process of the present invention for coloring regenerated cellulose film formed from viscose solutions, the process of the present invention can be used to color cellulosic materials formed from the cuprammonium process. Illustrative of other examples of where the process of the present invention can be used to color cellulosic materials such as films, include cellulosic materials formed from alkali soluble hydroxyethyl cellulose, cellulose nitrate and cellulose acetate.

The nature and details of this invention will become apparent by reference to the following specific examples, it being understood that these examples are merely illustrative embodiments of the invention and that the scope of the invention is not limited thereto.

*Example 1*

A mixer of approximately one gallon capacity, having a supply opening and a discharge opening and constructed to turbulently mix and continuously pass viscose therethrough, was installed upstream of an extrusion nozzle placed in an extrusion machine. The piping from the discharge opening of the mixer was valved through a series of different length pipes to allow for a passage time of from five minutes to thirty minutes from the entry into the mixer to the entry into the extrusion nozzle. Also provided on the mixer, in close proximity to the supply opening, were two separate metering ports, a first metering port for the addition of the vat dye slurry and a second metering port for the addition of the reducing solution.

A viscose composition maintained at 35° C. was passed through a mixer, as described above, at a rate of 180 pounds viscose per hour and under a pressure of about 40 to 80 pounds per square inch and then discharged from the discharge opening to a supply line to an extrusion nozzle for manufacture of regenerated cellulosic film as described in U.S. Patents Nos. 2,999,757 and 2,999,756.

A vat dye slurry comprised of

| | Parts |
|---|---|
| Color Index Vat Yellow 1 Cromophtal Yellow ATR paste (14-15% pigment solids) | 20 |
| Ponsol Scarlet RX paste (10-11% pigment solids) | 1 |
| Water | 28 | was then continuously metered through one of the metering ports to the viscose using a positive displacement pump under a pressure of about two to three pounds greater than the viscose feed. The vat dye slurry was added at a rate of 11.0 milliliters per minute (0.34% paste by weight of viscose).

A separate stream of alkaline sodium hydrosulfite reducing solution comprised of 6% sodium hydroxide and 3.5% sodium hydrosulfite, was simultaneously and separately metered to the viscose through a second metering port in the mixer in a manner described for the vat dye slurry. The reducing solution was added at a rate of 11.25 milliliters per minute (.03% sodium hydrosulfite by weight of viscose).

The viscose, vat dye and reducing agent were turbulently mixed in the continuous mixer from the entry into the mixer to the discharge opening, to result in a homogeneous mixture being formed in the hold-up time of the mixer. At the indicated flow rate of viscose, this was about three to four minutes. Precautions were taken to insure that no air entered the mixer.

After exiting from the mixer, the homogeneous composite composition was passed through pipes to the extrusion nozzle. The time elapse from that of the addition of the vat dye and reducing agent to the viscose, to the extrusion nozzle and the coagulating and regenerating bath, was about ten minutes. During this period the vat dye was reduced to its soluble leuco form. After coagulation, regeneration, washing, plasticizing and drying, the resultant colored films were transparent, clear and speck-free.

*Example 2*

In the manner described in Example 1, Color Index Vat Orange 15 sold under the common description of Golden Orange 3G paste (11-12% pigment solids) was diluted with three parts water and the slurry was then metered in heated viscose, 35° C. at a rate of 10 milliliters per minute (0.195 pigment paste by weight of viscose). A separate stream of alkaline sodium hydrosulfite reducing solution was metered into the viscose in the manner and rate described in Example 1. The total elapsed time from onset of the turbulent mixing to extrusion was ten minutes and was sufficient to convert the vat dye to its soluble leuco form. Colored films of regenerated cellulose produced from the viscose composition were transparent and speck-free.

*Example 3*

A red anthraquinone type vat dyestuff sold under the trade name Ponsol Scarlet RX paste (10-11% pigment solids) was diluted with 1.5 parts of water and the slurry metered into viscose heated to 42° C. in the manner described in Example 1 at a rate of 11 milliliters per minute (0.34% paste by weight of viscose). A separate stream of alkaline sodium hydrosulfite reducing solution was metered into the viscose in the manner and rate described in Example 1. The time from addition of components to the viscose to the time of extrusion was ten minutes. The vat dye was reduced to its soluble leuco form during this period. Colored films of regenerated cellulose produced from the viscose composition were transparent and speck-free.

*Example 4*

A porous hemp paper was curved about its longitudinal axis to form a tube with overlapping longitudinal margins pasted with a viscose composition. The tube was impregnated with a viscose composition containing a vat dye in the leuco form. The viscose compositions were applied to the external paper tubing surface by means of an annular viscose extrusion nozzle and allowed to penetrate into the paper. Regeneration of the cellulose in the viscose was effected by passing the viscose impregnated tubing through a series of aqueous regenerating baths. The resultant fibrous reinforced regenerated cellulose casing was water-washed, glycerinated and then dried in a continuous manner according to procedures known to those skilled in the art as exemplified by Smith, U.S. Patent No. 2,144,900.

In the manner described in Example 1, the viscose containing the vat dye in the soluble leuco form was prepared by passing viscose, maintained at 40° C. to 45° C., through the mixer at the rate of 186 pounds per hour.

A vat dye slurry comprised of

| | Parts |
|---|---|
| Color Index Vat Yellow 1 Cromophtal Yellow ATR paste (14-15% pigment solids) | 2 |
| Ponsol Scarlet RX paste (10-11% pigment solids) | 1 |
| Water | 2 | was continuously metered into the viscose at the rate of 18 milliliters per minute (0.47% paste by weight of viscose). A separate stream of alkaline sodium hydrosulfite reducing solution comprised of 6% sodium hydroxide and 7.0% sodium hydrosulfite, was simultaneously and separately added to the viscose through a second metering port at the rate of 15 milliliters per minute (0.081% of sodium hydrosulfite by weight of viscose).

The time between the addition of the vat dye and reducing solution to the viscose in the mixer and the extrusion of the viscose composition was about eight to ten minutes. The colored casings produced were bright and clear and speck-free.

*Example 5*

A clear, transparent and speck-free film was prepared according to the method in Example 1 except that the viscose composition entering the mixer was at 20° C., and passing through at the rate of 290 pounds of viscose per hour.

The vat dye slurry comprised of

| | Parts |
|---|---|
| Ahcovat Orange RRT paste (14-17% pigment solids) Vat Orange 2 | 3 |
| Water | 4 | was metered to the mixer at the rate of 17.1 milliliters of dye slurry per minute (0.36% paste by weight of viscose).

A reducing solution of 8% sodium hydroxide and 7% sodium hydrosulfite was separately and simultaneously metered into the mixer at the rate of 13.7 milliliters of solution per minute (0.045% by weight of viscose). The vat dye was reduced to its soluble leuco form in seven minutes. There was a temperature rise of about 3° C. to 5° C. of the viscose composition discharging from the mixer.

*Example 6*

A clear, transparent and speck-free colored film was prepared according to the method of Example 1 except that the viscose composition entering the mixer was at 20° C. and passing through at the rate of 125 pounds per hour.

The vat dye was comprised of

| | Parts |
|---|---|
| Color Index Vat Orange 9 Ponsol Golden Orange G paste (14%-17% pigment solids) | 7.5 |
| Water | 26 | and was metered into the viscose at the rate of 6.2 milliliters per minute (0.17% vat dye paste by weight of viscose).

A reducing solution of 8% sodium hydroxide and 7% sodium hydrosulfite was simultaneously and separately added to the viscose at a rate of 7.0 milliliters per minute (0.051% by weight of viscose). The vat dye was reduced to its soluble leuco form in twenty minutes. There was a temperature rise of about 5° C. in the viscose composition discharging from the mixer.

*Example 7*

When the same diluted vat dye slurry and reducing agent as shown in Example 6 were metered into the viscose entering the mixer at 20° C. and the reaction time was only fifteen minutes between dye and sodium hydrosulfite, the resultant casing had a high degree of opacity.

A film was prepared according to the method in Example 1 except the viscose composition entering the mixer was at 20° C. and passing through at the rate of 175 pounds per hour. The vat dye slurry of Example 6 was metered in at a rate of 5.6 milliliters per minute (0.11% paste by weight of viscose) and the reducing solution of Example 6 was metered in at the rate of 10 milliliters of reducing solution per minute (.0516% by weight of viscose). The viscose composition discharging from the mixer was about 25° C. The total time lapse from the addition of the vat dye solution and reducing agent to the viscose to the extrusion nozzle was fifteen minutes. The resulting film had a high degree of opacity.

*Example 8*

Raising the temperature of the viscose to 40° C. will reduce the Ponsol Golden Orange G vat dye of Example 6 to the soluble leuco form in about five minutes.

In the method described in Example 4, the viscose composition entering the mixer was at 40° C. and was passed through the mixer at a rate of 300 pounds of viscose per hour.

The vat dye solution comprised of

| | Parts |
|---|---|
| Ponsol Scarlet RX paste (10-11% pigment solids) | 1 |
| Color Index Vat Orange 9 Ponsol Golden Orange G paste (14%-17% pigment solids) | 10 |
| Water | 22 | was metered into the viscose at the rate of 13.5 milliliters per minute (0.22% vat dye paste by weight of viscose). A 7% sodium hydrosulfite and 8% sodium hydroxide reducing solution was separately and simultaneously metered into the viscose at the rate of 20.0 milliliters per minute (0.061% by weight of viscose). The vat dye was reduced to its soluble leuco form in about five minutes. Colored film made with a time lapse of five minutes from the time of entry of the viscose to the mixer to the entry to the extrusion nozzle was clear, transparent and speck-free.

*Example 9*

A clear, transparent and speck-free colored film was prepared according to the method of Example 4 except that the viscose composition entering the mixer was at 42° C. and passing through at the rate of 300 pounds per hour.

The vat dye slurry comprised of

| | Parts |
|---|---|
| Color Index Vat Yellow 1 Cromopthal Yellow ATR paste (14%-15% pigment solids) | 3.85 |
| Ponsol Scarlet RX paste (10-11% pigment solids) | 0.52 |
| Water | 3.95 | was metered into the viscose at the rate of 27.2 milliliters per minute (0.69 vat dye paste by weight of viscose).

A reducing solution of 8% sodium hydroxide and 7% sodium hydrosulfite was simultaneously and separately added to the viscose at a rate of 22.0 milliliters per minute (0.067% by weight of viscose). A time lapse of less than twenty minutes reduced the vat dye to its soluble leuco form.

*Example 10*

A clear, transparent and speck-free colored film was prepared according to the method of Example 4 except that the viscose composition entering the mixer was at 42° C. and passing through at the rate of 340 pounds per hour.

The vat dye slurry comprised of

| | Parts |
|---|---|
| Ponsol Scarlet RX paste (10-11% pigment solids) | 17 |
| Water | 19.25 | was metered into the viscose at the rate of 19.0 milliliters per minute (0.43% vat dye paste by weight of viscose).

A reducing solution of 8% sodium hydroxide and 7% sodium hydrosulfite was simultaneously and separately added to the viscose at a rate of 24 milliliters per minute (0.065% sodium hydrosulfite by weight of viscose). A time lapse of less than twenty minutes reduced the vat dye to its soluble leuco form.

*Example 11*

A clear, transparent and speck-free colored film was prepared according to the method of Example 4 except that the viscose composition was passing through the mixer at the rate of 125 pounds per hour.

The vat dye slurry comprised of

| | Parts |
|---|---|
| Ponsol Red Brown N paste (9-11% pigment solids) | 4 |
| Color Index Vat Orange 9 Ponsol Golden Orange G paste (14-17% pigment solids) | 1 |
| Water | 22.5 | was metered into the viscose at the rate of 8.5 milliliters per minute (0.18% vat dye paste by weight of viscose).

A reducing solution of 8% sodium hydroxide and 7% sodium hydrosulfite was simultaneously and separately added to the viscose at a rate of 7.1 milliliters per minute (0.0582% by weight of viscose). A time lapse of less than twenty minutes reduced the vat dyes to their soluble leuco forms.

Preferably the viscose, vat dye and reducing agent are mixed in a mixing apparatus capable of rapidly and turbulently and in the absence of air forming a homogeneous mixture before undesirable and unwanted changes occur, as for example, the gelation of the viscose caused by localized effects of the reducing agent. It is obvious that the temperature of mixing can be readily controlled with a cooling or heating jacket about the mixer.

One form of mixing apparatus, suitable for rapidly and continuously preparing and metering to suitable viscose extrusion and regenerating means a satisfactory viscose-vat dye-reducing agent mixture, is the water-cooled mixer described in copending application Serial No. 846,868, filed October 16, 1959; said mixer comprising a cooling water-jacketed cylindrical mixing chamber having a supply opening and a discharge opening and individual metering ports for the vat dye slurry and the reducing solution to be pressure fed into the mixer in close proximity to the supply opening. A rotor means within the chamber is constructed and positioned to shear and turbulently mix together the various solutions fed into the chamber.

The mixer is constructed so that the rotor has a relatively large diameter to take advantage of the effect of tangential velocity on shearing the ingredients at the inlet ports and turbulently mixing them in their passage through the mixer. The totally enclosed nature of the mixer insures that no air is whipped into the viscose, and eliminates the need to evacuate the viscose after passing through the mixer. Preferably the metering ports are positioned so that the vat dye slurry and/or reducing solution will enter in close proximity to the supply opening, to provide maximum mixing time. The rapid and turbulent mixing will tend to heat the viscose composition being mixed. The temperature can be controlled with a heating and/or cooling jacket. It is obvious that more than one mixer can be used in series to get increased mixing time. Also the vat dye can be added to a first mixer and the vat dye-viscose composition can then pass to a second mixer wherein the reducing solution is metered in the composition and the composite mass turbulently mixed. The elapsed periods of time are considered from that of the addition of the final component to the vat dye, viscose, reducing agent composition to the time of extrusion.

The vat dye can be added to the viscose in the form of a pigment paste or a diluted slurry containing dispersing and wetting agents. As commercially received the vat dyes are in the form of pigment pastes, usually varying in concentration from about 10% to 17% pigment, by weight, in the paste. These pastes can be metered directly into the viscose or can be diluted with water and the diluted slurry metered into the viscose. The vat dye can be a single vat dye or a mixture of dyes, depending upon the final color desired. Vat dyes that can be reduced to the soluble leuco form in viscose in less than thirty minutes are preferred. It is preferred to use those vat dyes in which at least 80% by weight of the dye is reduced to its soluble leuco form in about five minutes at a temperature of 25° C. Optimumly it is preferred to use those vat dyes in which at least 90% by weight of the dye is reduced to its soluble leuco form in about five minutes at a temperature of 25° C.

The percentage reduction of the vat dye can be readily obtained by adding 0.008 to 0.016% vat dye paste to a reducing solution of alkaline sodium hydrosulfite comprised of 0.2% sodium hydroxide and 6.1% sodium hydroxide and comparing the absorption peak at a wave length for maximum absorption of this solution with the absorption peak at the same wave length, using a 1.5% sodium hydrosulfite reducing solution and a time of ten minutes as the control for 100% reduction to the soluble leuco form.

Preferably, the viscose is maintained at a temperature above room temperature and below that at which it will increase in viscosity during passage through the heat exchanger, mixer and connecting lines to the extrusion nozzle. Temperatures below about 75° C. are preferred and optimumly are from 35° to 55° C.

The maximum practical temperature that can be used will be limited by the viscose index and the time the viscose is held at the elevated temperature. The rate of viscose gelation increases with the temperature. Thus, holding viscose of low index at too high a temperature for several minutes will result in an increase in viscosity of the viscose, with the extreme case of gelation and clogging of the viscose feed lines.

As an example of this, a viscose of index of 20 will gel at 90° C. in about five minutes. For viscose compositions of 6–8% cellulose, 5 to 7% caustic by weight, and a degree of ripeness in the 30 to 50 index range, maximum temperature below about 75° C. and preferably below about 55° C., can be readily used for time periods of less than thirty minutes.

Preferably, the viscose, vat dye and reducing agent are mixed at elevated temperatures to decrease the reaction time needed and to reduce the viscosity of the viscose to allow for improved rapid and turbulent mixing. If desired, the viscose containing the vat dye in the soluble leuco form can be extruded at an elevated temperature or the composition can be cooled prior to extrusion.

The minimum quantity of reducing agent such as sodium hydrosulfite to be added will necessarily depend on the requirements of the vat dye employed. The maximum concentration of the sodium hydrosulfite solution will be dependent upon the efficiency of the turbulent mixing and the concentration of the reducing solution which will cause gel formation in the viscose.

It is obvious that the solution of the sodium hydrosulfite should be metered into the viscose and turbulently mixed at such a rate as to prevent localized concentrations of sodium hydrosulfite sufficient to cause gelatin of the viscose.

Aqueous alkaline sodium hydrosulfite solutions satisfactorily used have ranged from 8% sodium hydroxide and 7% sodium hydrosulfite by weight to less than 6% sodium hydroxide and 3.5% sodium hydrosulfite. It appears that the maximum concentration will be dependent upon the temperature of the viscose, the elapsed time for the mixture to pass through the mixer and to and through the extrusion nozzle and the reaction time needed to reduce the vat dye to its soluble leuco form.

The preferred range of concentration of the aqueous reducing solution to be metered to the viscose is from 0.02% to 8% sodium hydrosulfite. The preferred amount of sodium hydrosulfite to viscose to reduce the vat dye, is 0.025% to 0.1% by weight.

Oxidation of the soluble leuco form of the vat dye back to its insoluble form occurs when the viscose is converted to regenerated cellulose in the acid regeneration and washing tanks customarily employed in the viscose process. It is understood that the conventional viscose process uses a desulfuring tub to improve the transparency of the film and the desulfuring of the colored regenerated cellulosic film is preferred to produce highly transparent film.

A composition of the viscose that can be used is that generally employed in the art for making seamless regenerated cellulose tubing with or without fibrous web embedded therein. Also, the compositions used for making sheet cellophane can be used. A viscose of the following composition is particularly suitable for the making of cellulose tubing:

Cellulose _____ percent__ 6–8
Caustic soda _____ do____ 5–7
Index _____ 28–50

The index value is the number of cubic centimeters of a 10% acetic acid solution required to completely gel 100 grams of viscose at room temperature.

The principles of this invention are applicable to known cellulose sausage casing constructions such as the casings prepared by annularly extruding and regenerating a viscose solution to form continuous cellulosic tubing including, but not restricted to, the casing described in U.S. Patents Nos. 1,601,686 and 1,612,509. The invention also has utility in the manufacture of seamless casings reinforced with a fibrous web as shown in U.S. Patents Nos. 2,105,273 and 2,144,900.

The preparation of colored cellulose casings having improved transparency can be readily accomplished by extruding and regenerating a homogeneous mixture of viscose solution and a vat dye in the leuco form in accordance with conventional techniques, as by extruding the viscose composition through an annular orifice into an aqueous coagulating and regenerating bath containing sodium sulfate and sulfuric acid. Thereafter, continuing the regeneration by successively passing the tubing through a series of tubs containing acid of sufficient strength to complete the regeneration, followed by immersion of the regenerated tubing into successive tubs of wash water to remove regeneration by-products from the tubing. The washed tubing is plasticized and then dried.

In the examples wherein a regenerated cellulosic film having a fibrous web embedded therein was made, the web was a bibulous paper formed of hemp fibers bonded together with regenerated cellulose. The fibrous web formed into a tube with viscose pasted overlapping marginal edges was impregnated and coated in each instance with an aqueous viscose composition containing 7% by weight of regeneratable cellulose, 6% by weight of sodium hydroxide and the indicated vat dye in the leuco form.

The viscose compositions containing the reduced vat dye were all extruded onto the fibrous web within about five to thirty minutes after the vat dye and reducing solution were added to the viscose. The tube, after impregnation and coating with the viscose, was passed through a series of conventional aqueous coagulating and regeneration baths containing sodium sulfate, sulfuric acid and ammonium sulfate. The resultant regenerated cellulose tubing was washed, plasticized and dried according to procedures known to those skilled in the art as exemplified by Smith, U.S. Patent No. 2,144,900.

It is understood that the colored regenerated cellulosic tubing can be made having an outer layer only of dyed cellulose. This can be done by extruding two annular conjoined viscose compositions through an extrusion nozzle, so controlled that essentially laminar flow occurs when the viscose is extruded through the annular opening of the extrusion nozzle. The inner annular viscose composition containing a clear viscose, and the outer annular viscose composition containing the vat dye in its soluble leuco form.

In the embodiment wherein cellulosic tubing containing a fibrous web embedded therein is made, if desired, the inner wall of the tubing can be coated with a clear undyed viscose composition. An alternative method is to impregnate and coat the fibrous web with two annular conjoined viscose compositions; the inner viscose composition being clear and undyed and the outer containing the vat dye in the leuco form. The inner viscose composition will penetrate the porous tubing and deposit on the inner wall, and the outer dyed viscose composition will form the outermost portion of the tubing.

The sausage casing produced by the methods described herein are admirably suited for the use in processing and packaging of meat products such as sausages and processed meat such as bologna, beer sausage, salami, summer sausage, dry sausage, hams, Canadian bacon, butts, pork butts, picnic sausage, and the like. The casings can also be used for products other than meat products such as cheese and other food products which require processing or distribution in casings.

Sheets or ribbons made of the colored regenerated cellulose film can also be used for wrapping and packaging of many articles of commerce as well as for decorative effects.

Since it is obvious that various changes and modifications may be made in the described invention without departing from the nature and spirit thereof, the invention is not restricted thereto except as set forth in the appended claims.

What is claimed is:

1. In a continuous process for producing colored films of regenerated cellulose, the steps which comprise continuously metering to a flowing viscose composition, a vat dye, in a quantity sufficient to impart the color desired; and an aqeous solution of a reducing agent of a concentration sufficient to reduce said vat dye into its soluble leuco form but insufficient to effect gelation of said viscose; simultaneously and turbulently mixing metered quantities of said viscose composition, vat dye and reducing agent in the absence of air until a homogeneous mixture is formed; passing the homogeneous mixture to the extrusion nozzle; the time lapse from the onset of the turbulent mixing to the time of extrusion being at least sufficient to reduce the vat dye to its soluble leuco form; and extruding the mixture of viscose and reduced dye into a regenerating bath and regenerating said viscose and oxidizing said vat dye to produce a colored regenerated cellulose film.

2. The process as in claim 1, wherein the vat dye is selected from the group in which at least 80% by weight of the dye is reduced to its soluble leuco form in about five minutes at a temperature of 25° C. in a 0.008 to 0.016% vat dye paste, 0.2% sodium hydrosulfite, 6.1% sodium hydroxide solution.

3. The process as in claim 1, wherein the reducing agent is sodium hydrosulfite and the concentration of sodium hydrosulfite to viscose is 0.025% to 0.1% by weight.

4. The process in claim 1, wherein the viscose is heated and maintained at a temperature to reduce the original viscosity thereof and less than 75° C., and the time at which it is maintained at the elevated temperature being insufficient to cause gelation of said viscose.

5. The process in claim 1 wherein the viscose is maintained at a temperature of 35° C. to 55° C. and the time at which it is maintained at these temperatures being insufficient to cause an increase in viscosity of the viscose and less than thirty minutes, and wherein the reducing agent is sodium hydrosulfite and the concentration of the sodium hydrosulfite to viscose is 0.025% to 0.1% by weight.

6. In a continuous process for producing colored films of regenerated cellulose, the steps which comprise continuously passing a viscose composition to a supply opening to a mixer, continuously metering into said viscose in the mixer a vat dye in a quantity sufficient to impart the color desired; simultaneously and separately metering into said viscose in the mixer an aqueous solution of a reducing agent of a concentration sufficient to reduce said vat dye into its soluble leuco form but insufficient to effect gelation of said viscose; continuously and turbulently mixing said viscose composition, vat dye and reducing agent in the absence of air until a homogeneous mixture is formed; discharging the homogeneous mixture from the mixer and to the extrusion nozzle; the time lapse from the onset of the turbulent mixing to the time of extrusion being at least sufficient to reduce the vat dye to its soluble leuco form; and extruding the mixture of viscose and reduced dye into a regenerating bath and regenerating said viscose and oxidizing said vat dye to produce a colored regenerated cellulose film.

7. The process in claim 6, wherein the vat dye is selected from the group in which at least 80% by weight of the dye is reduced to its soluble leuco form in about five minutes at a temperature of 25° C. in a 0.008 to 0.016% vat dye paste, 0.2% sodium hydrosulfite, 6.1% sodium hydroxide solution.

8. The process in claim 6, wherein the reducing agent is sodium hydrosulfite and the concentration of sodium hydrosulfite to viscose is 0.025% to 0.1% by weight.

9. The process in claim 6, wherein the viscose is heated and maintained at a temperature to reduce the original viscosity thereof and less than 75° C., and the time at which it is maintained at the elevated temperature being insufficient to cause an increase in viscosity and less than thirty minutes.

10. The process in claim 6 wherein the viscose is maintained at a temperature of 35° C. to 55° C. and the time at which it is maintained at these temperatures being insufficient to cause an increase in viscosity of the viscose and less than thirty minutes, and wherein the reducing agent is sodium hydrosulfite and the concentration of the sodium hydrosulfite to viscose is 0.025% to 0.1% by weight.

11. In a continuous process for producing colored films of regenerated cellulose, the steps which comprise continuously metering to a flowing viscose composition a vat dye in a quantity sufficient to impart the color desired, homogeneously mixing said vat dye and viscose; continuously metering to the vat dye-viscose composition an aqueous solution of a reducing agent of a concentration sufficient to reduce said vat dye into its soluble leuco form but insufficient to effect gelation of said viscose; simultaneously and turbulently mixing metered quantities of said viscose, vat dye and reducing agent in the absence of air until a homogeneous mixture is formed; passing the homogeneous mixture to the extrusion nozzle; the time lapse from the onset of the turbulent mixing to the time of extrusion being at least sufficient to reduce the vat dye to its soluble leuco form; and extruding the mixture of viscose and reduced dye into a regenerating bath and regenerating said viscose and oxidizing said vat dye to produce a colored regenerated cellulose film.

12. The process in claim 11 wherein the vat dye is selected from the group in which at least 80% by weight of the dye is reduced to its soluble leuco form in about five minutes at a temperature of 25° C. in a 0.008 to 0.016% vat dye paste, 0.2% sodium hydrosulfite, 6.1% sodium hydroxide solution.

13. The process in claim 11 wherein the reducing agent is sodium hydrosulfite and the concentration of sodium hydrosulfite to viscose is 0.025% to 0.1% by weight.

14. The process in claim 11 wherein the viscose is heated and maintained at a temperature to reduce the original viscosity thereof and less than 75° C., and the time at which it is maintained at the elevated temperature being insufficient to cause an increase in viscosity and less than thirty minutes.

15. The process in claim 11 wherein the viscose is maintained at a temperature of 35° C. to 55° C. and the time at which it is maintained at these temperatures being insufficient to cause an increase in viscosity of the viscose and less than thirty minutes, and wherein the reducing agent is sodium hydrosulfite and the concentration of the sodium hydrosulfite to viscose is 0.025% to 0.1% by weight.

References Cited by the Examiner
UNITED STATES PATENTS

| | | | |
|---|---|---|---|
| 2,043,069 | 6/1936 | Rusch | 264—78 |
| 2,738,252 | 3/1956 | Lutgerhorst | 264—78 |
| 3,005,723 | 10/1961 | Batt | 264—78 |

ROBERT F. WHITE, *Primary Examiner.*

ALEXANDER H. BRODMERKEL, *Examiner.*